United States Patent
Wu et al.

(10) Patent No.: US 9,613,387 B2
(45) Date of Patent: Apr. 4, 2017

(54) UNIVERSAL SERIAL BUS DEVICE APPLIED TO WEBCAMS AND METHOD THEREOF

(75) Inventors: Ben Wu, Taipei (TW); Chih-Kao Chen, New Taipei (TW); Yuan-Chang Chien, Taipei (TW); Hong-Yeh Hsieh, Taipei (TW)

(73) Assignee: eEver Technology, Inc., Taipei (TW)

( * ) Notice: Subject to any disclaimer, the term of this patent is extended or adjusted under 35 U.S.C. 154(b) by 796 days.

(21) Appl. No.: 13/330,677

(22) Filed: Dec. 20, 2011

(65) Prior Publication Data

US 2012/0176472 A1 Jul. 12, 2012

Related U.S. Application Data

(60) Provisional application No. 61/431,061, filed on Jan. 10, 2011.

(30) Foreign Application Priority Data

Apr. 22, 2011 (TW) .............................. 100114036 A

(51) Int. Cl.
*H04N 13/00* (2006.01)
*G06T 1/00* (2006.01)

(52) U.S. Cl.
CPC .................................. *G06T 1/0007* (2013.01)

(58) Field of Classification Search
CPC .................................................. G06T 1/0007
USPC ...... 348/E13.005, E13.071, E13.074, 43, 47
See application file for complete search history.

(56) References Cited

U.S. PATENT DOCUMENTS

| | | | |
|---|---|---|---|
| 2003/0095711 A1* | 5/2003 | McGuinness et al. | 382/209 |
| 2004/0187044 A1* | 9/2004 | Barman | G06F 3/005 713/400 |
| 2008/0024596 A1 | 1/2008 | Li | |
| 2009/0237490 A1* | 9/2009 | Nelson, Jr. | H04N 5/2252 348/43 |
| 2010/0080485 A1* | 4/2010 | Chen et al. | 382/266 |
| 2010/0157024 A1* | 6/2010 | Park | H04N 13/0029 348/51 |

FOREIGN PATENT DOCUMENTS

CN 101496415 A 7/2009

* cited by examiner

*Primary Examiner* — Dakshesh Parikh
(74) *Attorney, Agent, or Firm* — Winston Hsu; Scott Margo

(57) ABSTRACT

A universal serial bus device includes at least two input interfaces, an input interface control unit, and an image input interface. Each input interface of the at least two input interfaces is coupled to an image sensor for receiving images generated by the image sensor and an identification bit corresponding to the image sensor. The input interface control unit is coupled to the at least two input interfaces for controlling the at least two input interfaces to receive images generated by the at least two image sensors and identification bits corresponding to the at least two image sensors in turn when the images generated by the at least two image sensors are used for synthesizing three-dimensional images. The image input interface is used for receiving and transmitting the images generated by the at least two image sensors and the identification bits corresponding to the at least two image sensors.

14 Claims, 5 Drawing Sheets

UNIVERSAL SERIAL BUS DEVICE APPLIED TO WEBCAMS AND METHOD THEREOF

CROSS REFERENCE TO RELATED APPLICATIONS

This application claims the benefit of U.S. Provisional Application No. 61/431,061, filed on Jan. 10, 2011 and entitled "Two sensors interface with single usb device," the contents of which are incorporated herein by reference.

BACKGROUND OF THE INVENTION

1. Field of the Invention

The present invention is related to a Universal Serial Bus device applied to webcams and a method thereof, and particularly to a Universal Serial Bus device applied to webcams and a method thereof that have at least two input interfaces.

2. Description of the Prior Art

Please refer to FIG. 1. FIG. 1 is a diagram illustrating a host 100 receiving images generated by two image sensors 108, 110 through two Universal Serial Buses 102, 104 and a hub 106 according to the prior art. As shown in FIG. 1, the Universal Serial Bus 102 is only for receiving an image IA generated by the image sensor 108 and performing image processing on the image IA to generate a first image IA'. The Universal Serial Bus 104 is only for receiving an image IB generated by the image sensor 110 and performing image processing on the image IB to generate a second image IB'. The hub 106 is used for receiving and transmitting the first image IA' and the second image IB' to the host 100. Operational software of the host 100 can determine input sequence corresponding to the first image IA' and the second image IB', and transmit the first image IA' and the second image IB' to the Internet.

However, as shown in FIG. 1, one Universal Serial Bus is used for receiving images generated by one image sensor, so the host needs a plurality of Universal Serial Bus devices to receive images generated by a plurality of image sensors when the host needs the images generated by the plurality of image sensors. Therefore, the Universal Serial Bus device provided by the prior art is not a convenient and practical device for a user.

SUMMARY OF THE INVENTION

An embodiment provides a Universal Serial Bus applied to webcams. The Universal Serial Bus includes at least two input interfaces, an input interface control unit, and an image input interface. Each input interface of the at least two input interfaces is coupled to an image sensor, and for receiving images generated by the image sensor and an identification bit corresponding to the image sensor. The input interface control unit is coupled to the at least two input interfaces for controlling the at least two input interfaces to receive images generated by the at least two image sensors and identification bits corresponding to the at least two image sensors in turn when the images generated by the at least two image sensors are at least two images for synthesizing three-dimensional images. The image input interface is coupled to the input interface control unit for receiving and transmitting the images generated by the at least two image sensors and the identification bits corresponding to the at least two image sensors.

Another embodiment provides a Universal Serial Bus applied to webcams. The Universal Serial Bus includes at least two input interfaces, an input interface control unit, and an image input interface. Each input interface of the at least two input interfaces is coupled to an image sensor, and for receiving images generated by the image sensor and an identification bit corresponding to the image sensor. The input interface control unit is coupled to the at least two input interfaces for controlling the at least two input interfaces to receive images generated by the at least two image sensors and identification bits corresponding to the at least two image sensors in turn or sequentially when the images generated by the at least two image sensors are at least two images not for synthesizing three-dimensional images. The image input interface is coupled to the input interface control unit for receiving and transmitting the images generated by the at least two image sensors and the identification bits corresponding to the at least two image sensors.

Another embodiment provides a method for controlling a Universal Serial Bus applied to webcams. The method includes receiving images generated by at least two image sensors and identification bits corresponding to the at least two image sensors by at least two input interfaces; determining whether the images generated by the at least two image sensors are at least two images for synthesizing three-dimensional images; the at least two input interfaces performing a corresponding operation according to a determination result.

The present invention provides a Universal Serial Bus device applied to webcams and a method thereof. The Universal Serial Bus device and the method utilize at least two input interfaces to receive images generated by at least two image sensors and identification bits corresponding to the at least two image sensors. When the images generated by the at least two image sensors are images for synthesizing three-dimensional images, the Universal Serial Bus device receives the images generated by the at least two image sensors in turn; when the images generated by the at least two image sensors are images not for synthesizing three-dimensional images, the Universal Serial Bus device receives the images generated by the at least two image sensors in turn or sequentially. Thus, the present invention can solve the disadvantage in the prior art of a host needing a plurality of Universal Serial Bus devices to receive images generated by a plurality of image sensors when the host needs the images generated by the plurality of image sensors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
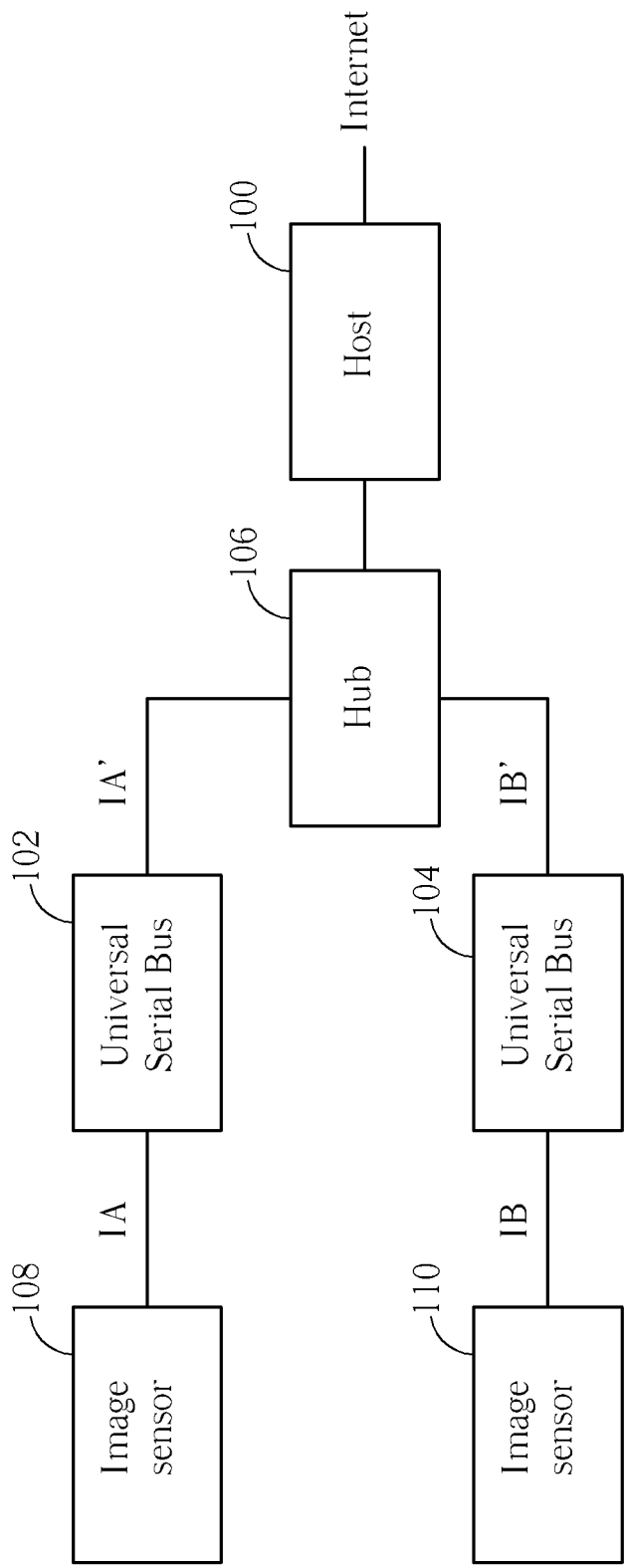
FIG. 1 is a diagram illustrating a host receives images generated by two image sensors through two Universal Serial Buses and a hub according to the prior art.
Figure 2A:
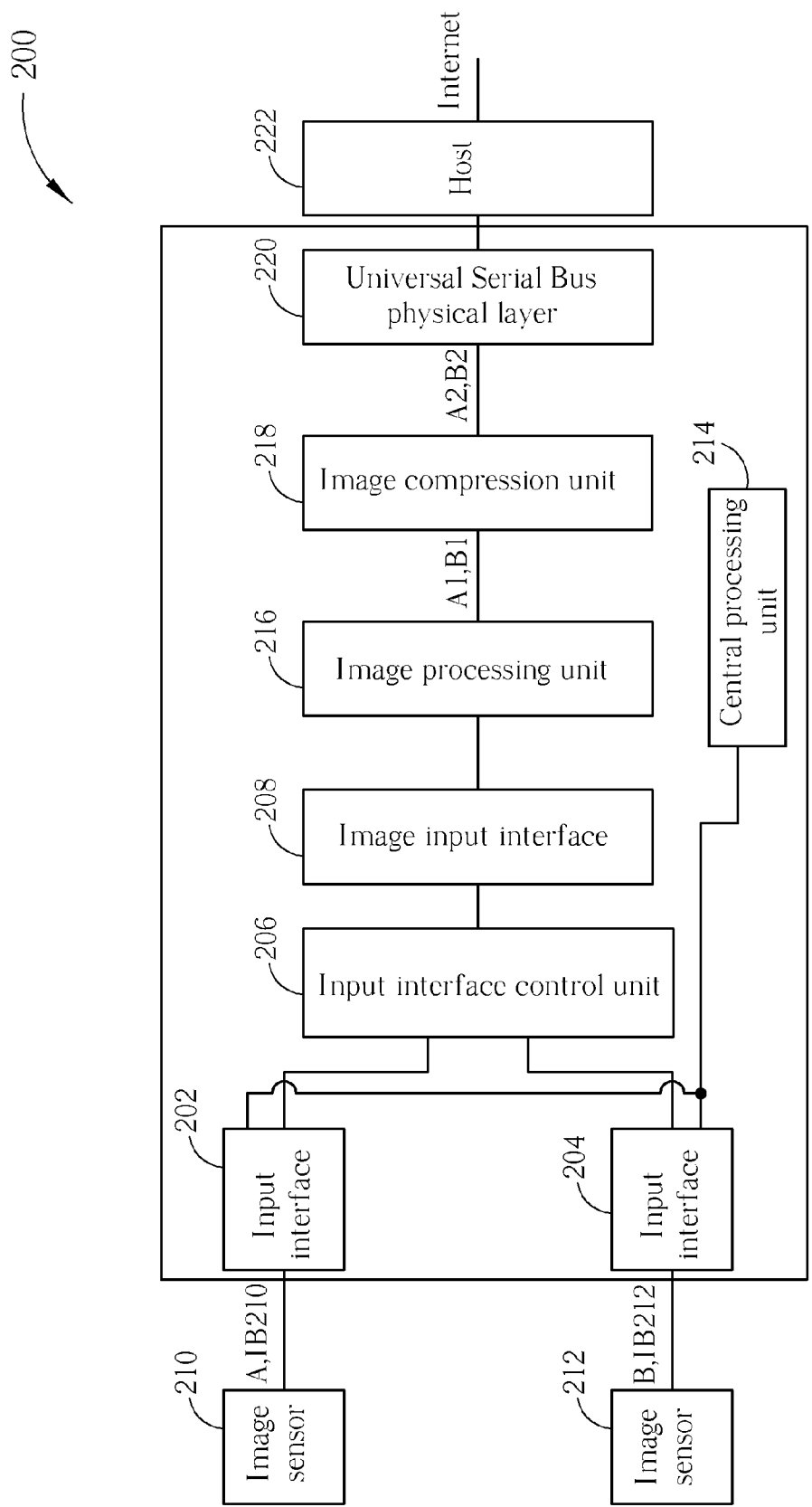
FIG. 2A is a diagram illustrating a Universal Serial Bus applied to webcams according to an embodiment
Figure 2B:
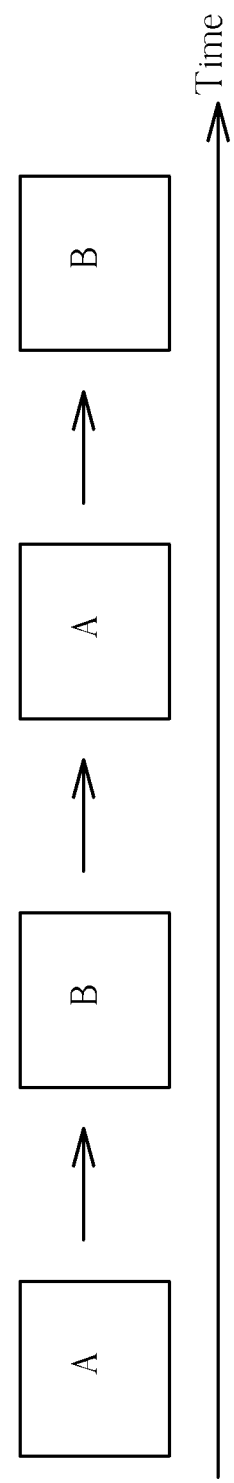
FIG. 2B is a diagram illustrating two input interfaces receiving images in turn.

Please refer to FIG. 2A and FIG. 2B. FIG. 2A is a diagram illustrating a Universal Serial Bus device 200 applied to webcams according to an embodiment, and FIG. 2B is a diagram illustrating two input interfaces receiving images in turn. The Universal Serial Bus device 200 includes two input interfaces 202, 204, an input interface control unit 206, and an image input interface 208. The input interface 202 is coupled to an image sensor 210 for receiving an image A generated by the image sensor 210 and an identification bit IB210 corresponding to the image sensor 210. The input interface 204 is coupled to an image sensor 212 for receiving an image B generated by the image sensor 212 and an identification bit IB212 corresponding to the image sensor 212. But, the present invention is not limited to the Universal Serial Bus device 200 only having the two input interfaces 202, 204. The input interface control unit 206 is coupled to the two input interfaces 202, 204 for controlling the two input interfaces 202, 204 to receive the images A, B generated by the two image sensor 210, 212 and the identification bits IB210, IB212 corresponding to the two image sensor 210, 212 in turn (as shown in FIG. 2B) when the images A, B generated by the two image sensor 210, 212 are images for synthesizing three-dimensional images. In addition, the image A is a left eye image or a right eye image and the image B is a left eye image or a right eye image, and pixels of the image A are the same as pixels of the image B. The image input interface 208 is coupled to the input interface control unit 206 for receiving and transmitting the images A, B generated by the image sensors 210, 212 and the identification bits IB210, IB212 corresponding to the image sensors 210, 212. In addition, the image sensors 210, 212 are charge-coupled device (CCD) image sensors and/or complementary metal-oxide-semiconductor (CMOS) image sensors.

The Universal Serial Bus device 200 further includes a central processing unit 214, an image processing unit 216, an image compression unit 218, and a Universal Serial Bus physical layer 220. The image processing unit 216 is coupled to the image input interface 208 for performing image processing on the images A, B generated by the image sensors 210, 212 to generate two first images A1, B1, where the image processing includes scaling, adjusting color, adjusting luminance, adjusting resolution, noise cancellation, edge enhancement, interpolation and/or adjusting contrast. The image compression unit 218 is coupled to the image processing unit 216 for performing data compression on the first images A1, B1 to generate two second images A2, B2, where the image compression unit 218 performs the data compression according to a Motion JPEG compression technology. The Universal Serial Bus physical layer 220 is used for connecting the Universal Serial Bus device 200 to a host 222, and transmitting the two second images A2, B2 to the host 222. In addition, the host 222 can transmit the two second images A2, B2 to the Internet, and identify that the image A is generated by the image sensor 210 and the image B is generated by the image sensor 212 by the identification bits IB210, IB212, respectively.

Figure 2C:
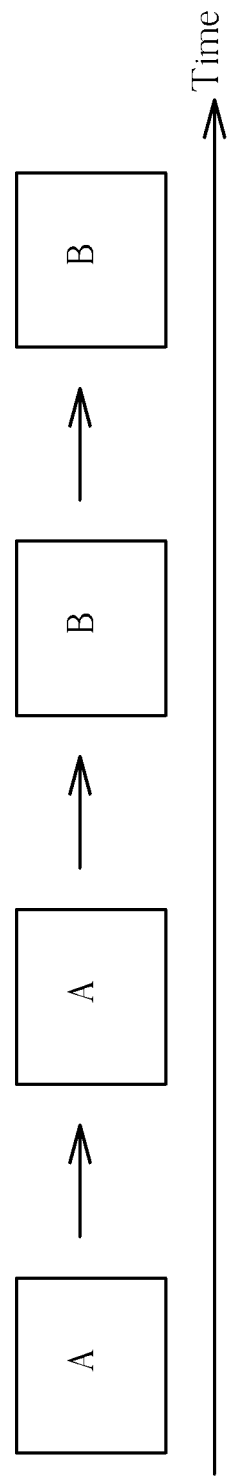
FIG. 2C is a diagram illustrating the input interfaces receiving images sequentially.

In addition, in another embodiment of the present invention, when the images A, B generated by the image sensors 210, 212 are images not for synthesizing three-dimensional images, the central processing unit 216 controls the input interfaces 202, 204 to receive the images A, B generated by the image sensors 210, 212 and the identification bits IB210, IB212 corresponding to the image sensors 210, 212 in turn or sequentially. Please refer to FIG. 2C. FIG. 2C is a diagram illustrating the input interfaces 202, 204 receiving images A, B sequentially. In addition, when the images A, B generated by the image sensors 210, 212 are the images not for synthesizing the three-dimensional images, pixels of the image A and pixels of the image B are the same or different.

Figure 3:
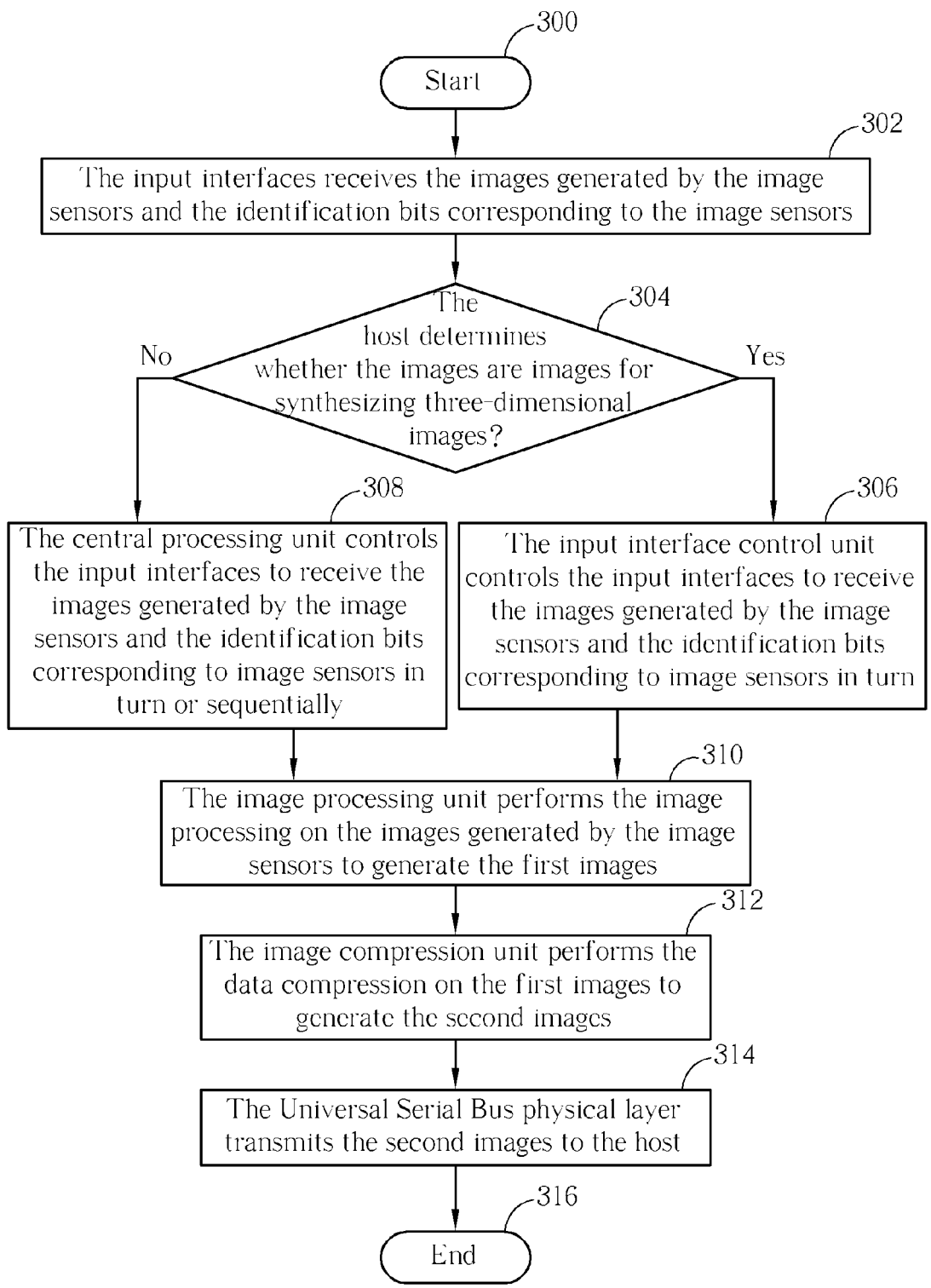
FIG. 3 is a flowchart illustrating a method for controlling a Universal Serial Bus applied to webcams according to another embodiment.

Please refer to FIG. 3. FIG. 3 is a flowchart illustrating a method for controlling a Universal Serial Bus device applied to webcams according to another embodiment. The method in FIG. 3 is illustrated using the Universal Serial Bus device 200 in FIG. 2A. Detailed steps are as follows:

Step 300: Start.

Step 302: The input interface 202 receives the image A generated by the image sensor 210 and the identification bit IB210 corresponding to the image sensor 210, and the input interface 204 receives the image B generated by the image sensor 212 and the identification bit IB212 corresponding to the image sensor 212.

Step 304: The host 222 determines whether the images A, B are images for synthesizing three-dimensional images. If yes, go to Step 306; if no, go to Step 308.

Step 306: The input interface control unit 206 controls the input interfaces 202, 204 to receive the images A, B generated by the image sensors 210, 212 and the identification bits IB210, IB212 corresponding to image sensors 210, 212 in turn; go to Step 310.

Step 308: The central processing unit 214 controls the input interfaces 202, 204 to receive the images A, B generated by the image sensors 210, 212 and the identification bits IB210, IB212 corresponding to image sensors 210, 212 in turn or sequentially.

Step 310: The image processing unit 216 performs the image processing on the images A, B generated by the image sensors 210, 212 to generate the first images A1, B1.

Step 312; The image compression unit 218 performs the data compression on the first images A1, B1 to generate the second images A2, B2.

Step 314: The Universal Serial Bus physical layer 220 transmits the second images A2, B2 to the host 222.

Step 316: End.

In Step 306, the image A is a left eye image or a right eye image, and the image B is a left eye image or a right eye image, and pixels of the image A are the same as pixels of the image B. In Step 308, when the images A, B generated by the image sensors 210, 212 are the images not for synthesizing the three-dimensional images, pixels of the image A and pixels of the image B are the same or different. In Step 310, the image processing includes scaling, adjusting color, adjusting luminance, adjusting resolution, noise cancellation, edge enhancement, interpolation and/or adjusting contrast. In Step 312, the image compression unit 218 performs the data compression according to the Motion JPEG compression technology. In Step 314, the host 222 can transmit the two second images A2, B2 to the Internet, and identify that the image A is generated by the image sensor 210 and the image B is generated by the image sensor 212 by the identification bits IB210, IB212, respectively.

To sum up, the Universal Serial Bus device applied to the webcams and the method thereof utilize the Universal Serial Bus device including the at least two input interfaces to receive the images generated by the at least two image sensors and the identification bits corresponding to the at least two image sensors. When the images generated by the at least two image sensors are the images for synthesizing the three-dimensional images, the Universal Serial Bus device receives the images generated by the at least two image sensors in turn; when the images generated by the at least two image sensors are the images not for synthesizing the three-dimensional images, the Universal Serial Bus device receives the images generated by the at least two image sensors in turn or sequentially. Thus, the present invention can solve the disadvantage in the prior art of the host needing a plurality of Universal Serial Bus devices to receive images generated by a plurality of image sensors when the host needs the images generated by the plurality of image sensors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Universal Serial Bus device applied to webcams, the Universal Serial Bus device comprising:

at least two input interfaces, each input interface being used for coupling to an image sensor, wherein the at least two input interfaces are used for receiving at least two images generated by at least two image sensors coupled to the at least two input interfaces and identification bits corresponding to the at least two image sensors, wherein the at least two input interfaces are not Universal Serial Bus interfaces, and the identification bits in turn received by the at least two input interfaces are used for making the at least two images be corresponding to each other when the at least two images generated by the at least two image sensors are used for synthesizing three-dimensional images;

an input interface control unit coupled to the at least two input interfaces for determining whether the at least two images are used for synthesizing the three-dimensional images and controlling a received sequence of the at least two images and the identification bits when the at least two input interfaces receive the at least two images and the identification bits in response to a determination that the at least two images generated by the at least two image sensors are used for synthesizing the three-dimensional images;

a central processing unit for determining whether the at least two images are used for synthesizing the three-dimensional images and controlling the received sequence of the at least two input interfaces and the identification bits when the at least two input interfaces receive the at least two images and the identification bits in response to a determination that the at least two images are not used for synthesizing the three-dimensional images;

an image input interface; and a single Universal Serial Bus physical layer, wherein the image input interface is coupled between the input interface control unit and the single Universal Serial Bus physical layer for receiving and transmitting the at least two images generated by the at least two image sensors and the identification bits corresponding to the at least two image sensors to the single Universal Serial Bus physical layer;

wherein the Universal Serial Bus device only uses the single Universal Serial Bus physical layer to connect with a host which is outside the Universal Serial Bus device and the host receives the at least two images and the identification bits corresponding to the at least two image sensors only via the single Universal Serial Bus physical layer, wherein the host is capable to identify that each of the at least two image is generated by which one of that at least two image sensors according to the identification bits;

wherein the at least two input interfaces, the input interface control unit, the image input interface, and the single Universal Serial Bus physical layer are physically integrated into the Universal Serial Bus device.

2. The Universal Serial Bus device of claim 1, further comprising:

an image processing unit coupled to the image input interface for performing image processing on the at least two images generated by the at least two image sensors to generate at least two first images; and an image compression unit coupled to the image processing unit for performing data compression on the at least two first images to generate at least two second images, wherein the single Universal Serial Bus physical layer receives and transmits the at least two second images and the identification bits corresponding to the at least two image sensors to the host.

3. The Universal Serial Bus device of claim 2, wherein the image processing comprises scaling, adjusting color, adjusting luminance, adjusting resolution, noise cancellation, edge enhancement, interpolation and/or adjusting contrast.

4. The Universal Serial Bus device of claim 1, wherein the at least two images for synthesizing the three-dimensional images are at least one left eye image and at least one right eye image.

5. The Universal Serial Bus device of claim 1, wherein pixels of the at least two images for synthesizing the three-dimensional images are the same.

6. A method for controlling a Universal Serial Bus device applied to webcams, wherein the Universal Serial Bus device comprises at least two input interfaces, an input interface control unit, an image input interface, and a single Universal Serial Bus physical layer, wherein the image input interface is coupled between the input interface control unit and the single Universal Serial Bus physical layer, and the at least two input interfaces, the input interface control unit, the image input interface, and the single Universal Serial Bus physical layer are physically integrated into the Universal Serial Bus device, the method comprising:

the at least two input interfaces receiving at least two images generated by at least two image sensors and identification bits corresponding to the at least two image sensors, wherein the at least two input interfaces are not Universal Serial Bus interfaces, and the identification bits in turn received by the at least two input interfaces are used for making the at least two images be corresponding to each other when the at least two images generated by the at least two image sensors are used for synthesizing three-dimensional images;

the input interface control unit and a central processing unit determining whether the at least two images generated by the at least two image sensors are used for synthesizing three-dimensional images;

the input interface control unit controlling a received sequence of the at least two images and the identification bits when the at least two input interfaces receive the at least two images and the identification bits in response to a determination that the at least two images generated by the at least two image sensors are used for synthesizing the three-dimensional images;

the central processing unit controlling the received sequence of the at least two input interfaces and the identification bits when the at least two input interfaces receive the at least two images and the identification bits in response to a determination that the at least two images are not used for synthesizing the three-dimensional images;

the image input interface receiving and transmitting the at least two images generated by the at least two image sensors and the identification bits corresponding to the at least two image sensors to the single Universal Serial Bus physical layer; and the Universal Serial Bus device only using the single Universal Serial Bus physical layer to connect with a host which is outside the Universal Serial Bus, wherein the host receives the at least two processed images and the identification bits corresponding to the at least two image sensors only via the single Universal Serial Bus physical layer, wherein the host is capable to identify that each of the at least two image is generated by which one of that at least two image sensors according to the identification bits.

7. The method of claim 6, wherein pixels of the at least two images not for synthesizing the three-dimensional images are the same.

8. The method of claim 6, wherein pixels of the at least two images not for synthesizing the three-dimensional images are different.

9. The method of claim 6, further comprising:

an image processing unit performing image processing on the at least two images generated by the at least two image sensors to generate at least two first images; and an image compression unit performing data compression on the at least two first images to generate at least two second images.

10. The method of claim 9, wherein the image processing comprises scaling, adjusting color, adjusting luminance, adjusting resolution, noise cancellation, edge enhancement, interpolation and/or adjusting contrast.

11. The method of claim 6, further comprising:

an image processing unit performing image processing on the at least two images generated by the at least two image sensors to generate at least two first images; and an image compression unit performing data compression on the at least two first images to generate at least two second images.

12. The method of claim 11, wherein the image processing comprises scaling, adjusting color, adjusting luminance, adjusting resolution, noise cancellation, edge enhancement, interpolation and/or adjusting contrast.

13. The method of claim 6, wherein the at least two images for synthesizing the three-dimensional images are at least one left eye image and at least one right eye image.

14. The method of claim 6, wherein pixels of the at least two images for synthesizing the three-dimensional images are the same.

* * * * *